United States Patent
White

(10) Patent No.: US 7,362,454 B2
(45) Date of Patent: Apr. 22, 2008

(54) METHOD AND SYSTEM FOR MEASURING OVERCOAT LAYER THICKNESS ON A THIN FILM DISK

(75) Inventor: Richard Longstreth White, Los Altos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 348 days.

(21) Appl. No.: 11/040,376

(22) Filed: Jan. 21, 2005

(65) Prior Publication Data
US 2006/0164656 A1    Jul. 27, 2006

(51) Int. Cl.
*G01B 11/28* (2006.01)

(52) U.S. Cl. ............ 356/630; 356/317; 356/632; 250/492.1; 250/459.1

(58) Field of Classification Search ............ 250/492.1, 250/492.2, 458.1, 459.1, 462.1, 225, 559.27; 356/72, 73, 311, 317, 318, 364–370, 630–632; 378/44, 45, 50; 427/10
See application file for complete search history.

(56) References Cited

U.S. PATENT DOCUMENTS 5,919,560 A    7/1999    Nishimori ............... 428/333

(Continued)

FOREIGN PATENT DOCUMENTS

| JP | 61120010 | 6/1986 |
|----|----------|--------|
| JP | 61250509 | 11/1986 |
| JP | 1023105  | 1/1989 |
| JP | 7012714  | 1/1995 |
| JP | 10153543 | 6/1998 |

(Continued)

OTHER PUBLICATIONS

-Koo, Yeon Dog. X-Ray lines close to Kll Augen electron energies fro mLron, Cobalt, Nickel, and Cooper monocrystals, 1990. Texas Tech University: Dissertation abstracts international. vol. 51-09, Section B, p. 4419.☐☐.*

(Continued)

*Primary Examiner*—Layla G. Lauchman
*Assistant Examiner*—Iyabo S Alli
(74) *Attorney, Agent, or Firm*—Kunzler & McKenzie

(57) ABSTRACT

A method for measuring the thickness of a thin film disk overcoat layer includes radiating x-rays on a thin film disk comprising at least one base layer and an overcoat layer, collecting fluorescence data on electromagnetic radiation fluoresced from the thin film disk, reflecting polarized light from a surface of the thin film disk corresponding to the overcoat layer, collecting ellipsometry data from the polarized light, and estimating the thickness of the overcoat layer using both the fluorescence data and the ellipsometry data. The method may further include providing a statistical model to determine optimal deposition and manufacturing parameters. A system to conduct the described method may include a data analyzer, an ellipsometry measurement device, and an x-ray fluorescence measurement device.

18 Claims, 4 Drawing Sheets

U.S. PATENT DOCUMENTS

| | | | | |
|---|---|---|---|---|
| 6,031,615 | A | 2/2000 | Meeks et al. | 356/381 |
| 6,040,198 | A * | 3/2000 | Komiya et al. | 438/16 |
| 6,091,485 | A | 7/2000 | Li et al. | 356/73 |
| 6,134,011 | A | 10/2000 | Klein et al. | 356/369 |
| 6,259,092 | B1 * | 7/2001 | Brizzolara et al. | 250/305 |
| 6,782,337 | B2 * | 8/2004 | Wack et al. | 356/630 |

FOREIGN PATENT DOCUMENTS

| | | |
|---|---|---|
| JP | 2000352506 | 12/2000 |
| WO | WO 03/098397 | 11/2003 |

OTHER PUBLICATIONS

Hasche, Klaus. Metrological characterization of nanometer film thickness standards for XRR and ellipsometry applications. Nov. 2003. Recent developments in traceable dimensional measurements II. vol. 5190, pp. 165-172.*

"Ultrafast Ellipsometric Mapping of Thin Films", IBM Technical Disclosure Bulletin, Feb. 1994, pp. 187-188.

* cited by examiner ly related to the thickness of the overcoat layer on the thin film

METHOD AND SYSTEM FOR MEASURING OVERCOAT LAYER THICKNESS ON A THIN FILM DISK

BACKGROUND OF THE INVENTION

1. Field of the Invention

This invention relates to thin film disks. More specifically, the invention relates to methods and systems for measuring disk overcoat layers.

2. Description of the Related Art

Thin film disks, such as disk drives, are used in a variety of applications including computers, car stereos, vending machines, media players, and automated teller machines (ATMs). In the foreseeable future, such disks will be introduced into additional machines and environments due to greater storage capacities, smaller footprints, and decreased prices. As thin film disks become more pervasive, the ability to ensure high performance becomes essential to delivering competitive products.

An integral part of ensuring high performance relates directly to the thickness of the overcoat layer on the thin film disks. The thickness and uniformity of the overcoat layer have a direct effect on the recording density achievable on magnetic media. Consequently, precise measurement of the overcoat thickness is critical to successfully manufacturing thin film disks.

One prior art method to measure overcoat layer thickness is known as ellipsometry. Ellipsometry is a highly accurate measurement technique that uses polarized light to characterize thin films, surfaces, and material microstructure. Ellipsometry uses a beam of incident light of known polarization that interacts with the material of interest, resulting in changes in the polarization of the light. The changes in polarization are measured by analyzing the light reflected from the sample.

Through the analysis of the reflected polarization, ellipsometry can yield information about layers that are thinner than the wavelength of the light itself, down to a single atomic layer or less. Depending on what is already known about the sample, the technique can probe a range of properties including the layer thickness, morphology, or chemical composition.

While very useful in measuring overcoat layer thickness, ellipsometry is dependent on a knowledge of the optical properties (such as the index of refraction and extinction coefficient) of the surface on which the overcoat layer resides. Inaccurate data or estimates due to variations in material composition and manufacturing variance may reduce the accuracy of thickness measurements for the overcoat layer.

FIG. 1 illustrates one embodiment of a thin film disk 100 with one or more base layers 110 including a substrate 120 and an overcoat layer 130. In practice, the optical properties of the base layers 110 vary due to differences in material composition, material thickness, material density, and the like. Variation in the properties of the base layers can result in measurement errors and can inhibit accurate determination of the thickness of the overcoat layer. In short, improving the performance of thin film disks 100 is impeded by measurement errors resulting from an inability to account for the variation in optical properties of the base layers 110.

From the foregoing discussion, it should be apparent that a need exists for a method and system for measuring overcoat layer thickness on a thin film disk with increased accuracy. Beneficially, such a method and system would facilitate obtaining improved thickness measurements for overcoat layers on thin film disks and would facilitate optimization of the processes associated with manufacturing thin film disks.

SUMMARY OF THE INVENTION

The present invention has been developed in response to the present state of the art, and in particular, in response to the problems and needs in the art that have not yet been fully solved by currently available thin film disks. Accordingly, the present invention has been developed to provide an apparatus, system, and method for measuring the thickness of a thin film disk overcoat layer that overcomes many or all of the above-discussed shortcomings in the art.

In one aspect of the present invention, a method for measuring the thickness of a thin film disk overcoat layer includes radiating x-rays on a thin film disk comprising at least one base layer and an overcoat layer, collecting fluorescence data on electromagnetic radiation fluoresced from the thin film disk, reflecting polarized light from a surface of the thin film disk corresponding to the overcoat layer, collecting ellipsometry data from the polarized light, and estimating the thickness of the overcoat layer using the fluorescence data and the ellipsometry data.

In one embodiment, collecting fluorescence data comprises detecting $K\alpha$ X-rays corresponding to a selected material. The intensity of $K\alpha$ X-rays may correlate to the thickness of particular layers underneath the overcoat layers. The additional information may be leveraged to generate better estimates of the actual thickness of the overcoat layer. Subsequently, the better estimates may be used to adjust various manufacturing parameters in order to more consistently approach an ideal thickness for the overcoat layer. Consequently, the method for measuring the thickness of a thin film disk overcoat layer facilitates obtaining improved thickness measurements for overcoat layers on thin film disks and optimize processes associated with manufacturing such disks.

In another aspect of the present invention, a system for measuring the thickness of a thin film disk overcoat layer includes an x-ray fluorescence measurement device configured to radiate x-rays on a thin film disk and collect spectroscopic data on electromagnetic radiation fluoresced from the thin film disk. The system may also include an ellipsometry measurement device configured to reflect light from a surface of the thin film disk and collect polarization data for the reflected light, as well as a data analyzer configured to estimate the thickness of the overcoat layer using the spectroscopic data and the polarization data.

The ellipsometry measurement device measures the changes in the polarization of light that occur when a beam of known polarization is reflected off the surface of the thin film disk. The changes in polarization may be used to estimate the thickness of the overcoat layer. The system utilizes the additional measurements provided by the x-ray fluorescence measurement device to improve the accuracy of thickness measurements for the overcoat layer.

In one embodiment, the data analyzer is a server in operable communication with the x-ray fluorescence measurement device and the ellipsometry measurement device. The data analyzer may include a statistical model for the thickness of the overcoat layer as a function of the spectroscopic data and the polarization data. In certain embodiments, the analyzed data may be used to optimize various deposition parameters and improve the consistency of the thickness of the overcoat layer. In one embodiment, the deposition equipment may be in operable communication with the data analysis server.

The statistical model used by the data analyzer may assume composite optical properties (such as a composite index of refraction and a composite extinction coefficient) for the base layers. In one embodiment, the statistical model may comprise parameters statistically derived from a plurality of manufacturing samples fabricated with systematically varied process parameters as directed by a design of experiment process.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The various elements and aspects of the present invention facilitate obtaining improved thickness measurements for overcoat layers on thin film disks. These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Figure 2:
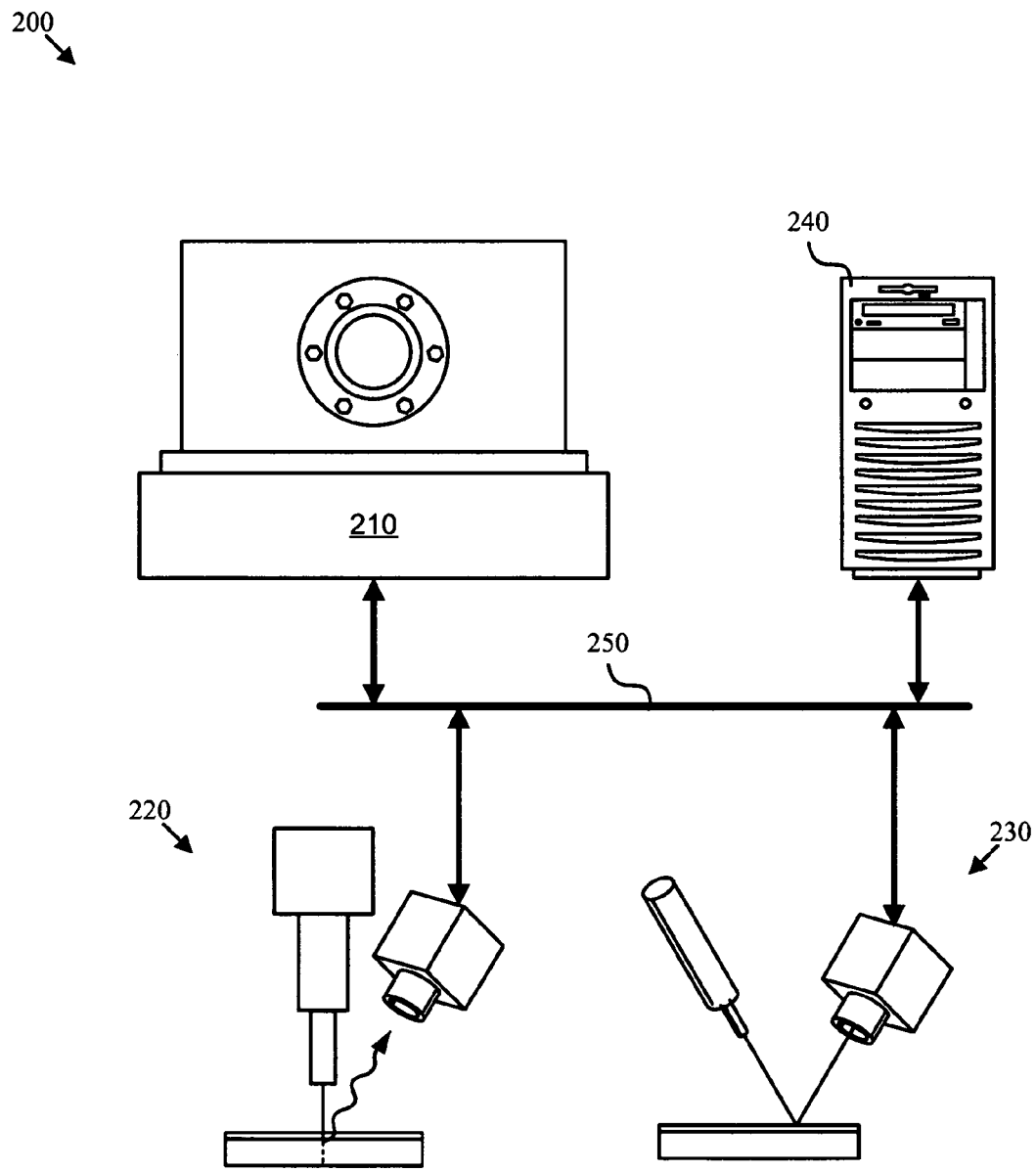
FIG. 2 is a schematic diagram depicting one embodiment of an overcoat layer measurement system of the present invention.

FIG. 2 is a schematic diagram depicting one embodiment of an overcoat layer measurement system 200 of the present invention. As depicted, the overcoat layer measurement system 200 includes a deposition tool 210, an ellipsometry measurement device 220, an x-ray fluorescence measurement device 230, a data analysis server 240, and a communication network 250. The overcoat layer measurement system 200 facilitates obtaining improved thickness measurements for overcoat layers on thin film disks 100 and optimizing deposition parameters associated with manufacturing such disks 100.

Figure 1:
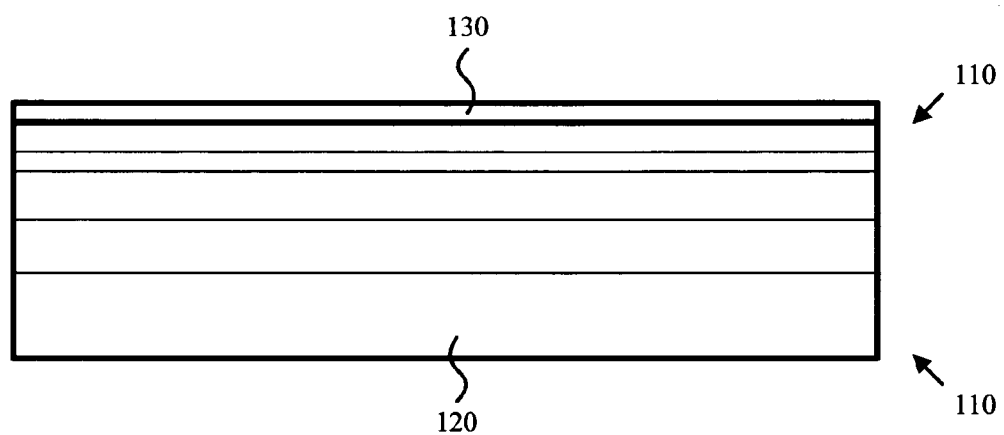
FIG. 1 is a cross-sectional illustration of a typical prior art thin film disk.

The deposition tool 210 deposits layers of material on a substrate to form a thin film disk 100 such as the thin film disk 100 illustrated in FIG. 1. In the depicted embodiment, the deposition tool 210 receives a bare substrate 120 and deposits additional base layers 110, including the overcoat layer 130, to provide a finished disk 100. Depositing all the layers within the same deposition tool decreases manufacturing cost, increases throughput, and reduces contamination, resulting in improved quality and better yields at a lower cost.

The ellipsometry measurement device 220 collects ellipsometric data for the thin film disk 100. In the depicted embodiment, the ellipsometry measurement device 220 measures the changes in the polarization of light that occur when a beam of known polarization is reflected off of the surface of the thin film disk 100, as explained previously. The ellipsometric measurements may be dependent on physical characteristics of the base layers 110, such as the index of refraction, extinction coefficient, and thickness of such layers. The present invention utilizes the collected polarization data to obtain more accurate thickness measurements for the overcoat layer 130.

In addition to the ellipsometry measurement device 220, the system 200 includes an x-ray fluorescence measurement device 230, which collects fluorescence measurements from the thin film disk 100. In certain embodiments, the x-ray fluorescence measurement device 230 includes a spectrometer that is able to detect x-ray photons of a specific wavelength range that are emitted when specific materials are excited by an x-ray. In one embodiment, the specific wavelength range corresponds to $K\alpha$ x-ray photons released in response to electrons within Cobalt atoms dropping to a lower quantum energy level after being temporarily raised to a higher quantum energy level by the incident X-ray beam.

In the aforementioned embodiment, the relative abundance of Kα x-rays may be measured and provided to the analysis server 240.

The analysis server 240 analyzes the polarization data provided by the ellipsometry measurement device 220 and the spectroscopic data provided by x-ray fluorescence measurement device 230. In certain embodiments, the analyzed data may be used to optimize various deposition parameters and improve the consistency of the thickness of the overcoat layer 130. In one embodiment, measurements from samples of known overcoat thickness are analyzed to determine and model the relationship between x-ray fluorescence data, ellipsometry data, and actual overcoat thickness. The statistical model may assume a composite index of refraction, a composite extinction coefficient, an infinite thickness, or the like for at least one base layer to optimize measurement and manufacturing processes.

The communication network 250 enables the various components of the overcoat layer measurement system 200 to communicate with each other. In the depicted embodiment, the communication network 250 enables near real-time communication and process control. For example, the deposition tool 210 may be in communication with the analysis server 240. Consequently, deposition parameters for a current batch within the deposition tool 210 may be adjusted in response to measurements from a previous batch being measured by measurement devices 220 and 230.

Figure 3:
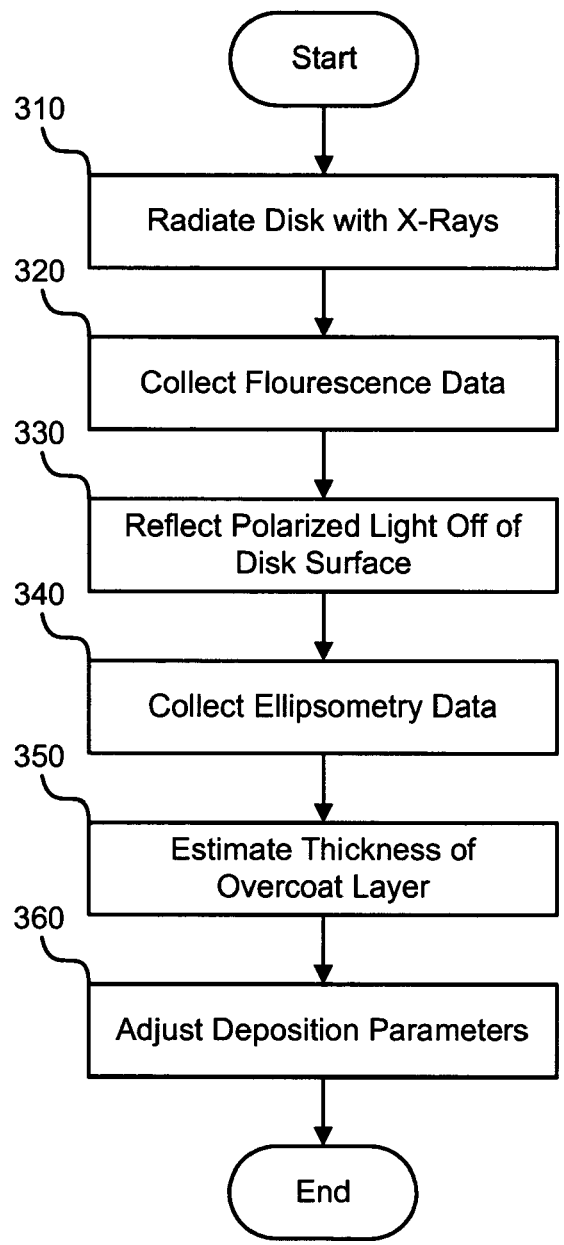
FIG. 3 is a flow chart diagram depicting one embodiment of an overcoat layer measurement method of present invention.

FIG. 3 is a flow chart diagram depicting one embodiment of an overcoat layer measurement method 300 of present invention. As depicted, the overcoat layer measurement method 300 includes radiating 310 a disk 100 with x-rays, collecting 320 fluorescence data, reflecting 330 polarized light off of a disk surface, collecting 340 ellipsometry data, estimating 350 the thickness of the overcoat layer, and adjusting 360 one or more deposition parameters.

Radiating 310 a disk 100 with x-rays excites atoms within the thin film disk 100 to a temporary high energy state. Upon dropping to a lower energy state, photons are emitted (i.e. fluoresced) at a wavelength corresponding to the change in energy states. The change in energy states and corresponding photon wavelengths may be unique to a specific element. Subsequently, collecting 320 fluorescence data provides valuable statistical data, such as the wavelength and intensity of photons fluoresced by the disk 100, that may correlate to the atomic composition of the disk layers and related characteristics such as a composite index of refraction and a composite extinction coefficient for the disk 100.

Polarized light of a known polarization and wavelength may also be reflected 330 off of a disk surface. Ellipsometry data may be collected 340 by measuring the change in polarity of the reflected light. Once collected, the ellipsometry and fluorescence data may be leveraged by the present invention in estimating 350 the thickness of the overcoat layer to a higher degree of accuracy than is attainable with just ellipsometry data. Subsequently, the estimate may be leveraged by adjusting 360 one or more process parameters in order to control the thickness of subsequently manufactured disks 100.

Figure 4:
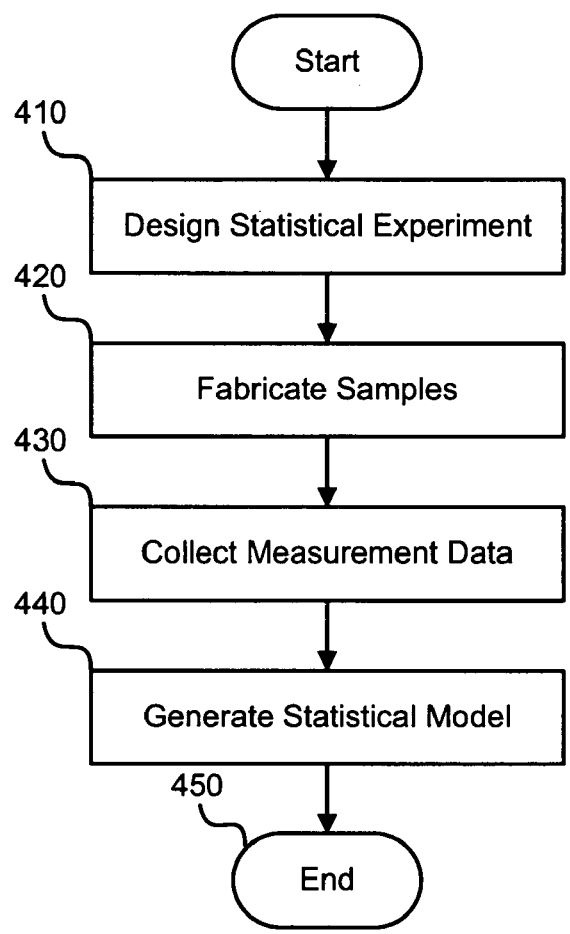
FIG. 4 is a flow chart diagram depicting one embodiment of an overcoat thickness modeling method of the present invention.

FIG. 4 is a flowchart diagram depicting one embodiment of an overcoat thickness modeling method 400 of the present invention. As depicted, the overcoat thickness modeling method 400 includes designing 410 a statistical experiment, fabricating 420 a set of samples, collecting 430 measurement data, and generating 440 a statistical or mathematical model. The overcoat thickness modeling method 400 may be used to enable execution of the estimate thickness step 350 depicted in FIG. 3.

Designing 410 a statistical experiment may include defining the probable range of various deposition parameters such as processing time, processing temperatures, material composition, and the like. In certain embodiments, statistical analysis software residing on the data analysis server 240 depicted in FIG. 2 may be used to define the parameter settings for a set of "experiments" that will provide the data necessary to model the relationship between the process parameters and the expected thickness, and the variance in thickness of the actual layers of the disk 100.

A plurality of samples, such as multiple disks 100 with various process parameters, may be fabricated 420 using the parameter settings defined in step 410. Accordingly, measurement data may be collected 430 that correlate to the thickness of the disks 100 and its layers. In one embodiment, the measurements include production measurements such as ellipsometry and x-ray fluorescence data along with lab-based measurements such as x-ray reflection, which are not cost effective for production use but are known to be highly accurate and useful for modeling purposes. Thus, accurate measurements from experimental data may be used to adjust manufacturing and deposition parameter Subsequent to collecting measurement data, the overcoat thickness modeling method 400 continues by generating 440 a statistical or mathematical model for the thickness of the overcoat layer as a function of the production measurements. In one embodiment, step 440 is conducted by executing statistical software residing on the data analysis server 240 depicted in FIG. 2. In certain embodiments, the statistical model of the estimated thickness of the overcoat layer may include an estimated composite index of refraction and/or a composite extinction coefficient for at least one base layer 110. Subsequent to generating 440 a statistical or mathematical model for the thickness of the overcoat layer, the method 400 ends 450.

The present invention improves the accuracy of measuring overcoat layers on thin film disks 100 or the like. Beneficially, collected data may be used to improve manufacturing techniques and, consequently, enhance the performance of thin film disks 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for measuring the thickness of a thin film disk overcoat layer, the method comprising:

radiating x-rays on a thin film disk comprising at least one base layer and an overcoat layer;

collecting fluorescence data on electromagnetic radiation comprising Kα X-ray photon energy with wavelengths corresponding to selected materials fluoresced from the thin film disk;

reflecting polarized light from a surface of the thin film disk corresponding to the overcoat layer;

collecting ellipsometry data from the polarized light reflected from metal layers below the overcoat layer;

correlating optical properties of metal layers below the overcoat layer with the fluorescence data, the optical properties comprising a composite index of refraction and a composite extinction coefficient;

adjusting the optical properties used in the ellipsometry data to reflect metal layer variation due to metal layer composition and metal layer manufacturing using the correlated optical properties derived from the fluorescence data; and estimating the thickness of the overcoat layer using the adjusted optical properties to correct for errors in the ellipsometry data.

2. The method of claim 1, wherein the selected material is Cobalt.

3. The method of claim 1, wherein estimating the thickness of the overcoat layer comprises estimating a composite index of refraction for the at least one base layer.

4. The method of claim 1, wherein estimating the thickness of the overcoat layer comprises estimating a composite extinction coefficient for the at least one base layer.

5. The method of claim 1, wherein estimating the thickness of the overcoat layer comprises conducting a statistical analysis on a plurality of manufacturing samples.

6. The method of claim 5, wherein the plurality of manufacturing samples are fabricated using systematically varied process parameters.

7. The method of claim 6, wherein the systematically varied process deposition parameters are determined using design of experiment techniques.

8. The method of claim 1, wherein estimating the thickness of the overcoat layer comprises collecting and analyzing design of experiment data.

9. The method of claim 1, further comprising adjusting manufacturing parameters to attain a desired thickness for the overcoat layer.

10. A system for measuring the thickness of a thin film disk overcoat layer, the system comprising:

an x-ray fluorescence measurement device configured to radiate x-rays on a thin film disk comprising at least one base layer and an overcoat layer and collect spectroscopic data comprising $K\alpha$ X-ray photon energy with wavelengths corresponding to Cobalt on electromagnetic radiation fluoresced from the thin film disk;

an ellipsometry measurement device configured to reflect light from a surface of the thin film disk corresponding to the overcoat layer and collect polarization data for the light reflected from metal layers below the overcoat layer; and a data analyzer configured to correlate optical properties of metal layers below the overcoat layer with the fluorescence data, the optical properties comprising a composite index of refraction and a composite extinction coefficient, the data analyzer further configured to adjust the optical properties used in the ellipsometry data to reflect metal layer variation due to metal layer composition and metal layer manufacturing using the correlated optical properties derived from the fluorescence data and estimate the thickness of the overcoat layer using the adjusted properties to correct for errors in the ellipsometry data.

11. The system of claim 10, wherein the data analyzer is a server in operable communication with the x-ray fluorescence measurement device and the ellipsometry measurement device x-ray.

12. The system of claim 10, further comprising deposition equipment in operable communication with the data analysis server.

13. The system of claim 10, wherein the data analyzer comprises a statistical model for the thickness of the overcoat layer as a function of the spectroscopic data and the polarization data.

14. The system of claim 13, wherein the statistical model assumes a composite index of refraction for the at least one base layer.

15. The system of claim 14, wherein the statistical model assumes a composite extinction coefficient for the at least one base layer.

16. The system of claim 15, wherein the statistical model assumes an infinite thickness for the at least one base layer.

17. The system of claim 13, wherein the statistical model comprises parameters statistically derived from a plurality of manufacturing samples fabricated with systematically varied process parameters.

18. A system for measuring the thickness of a thin film disk overcoat layer, the system comprising:

an X-ray fluorescence measurement device configured to radiate X-rays on a thin film disk comprising at least one base layer and an overcoat layer and collect spectroscopic data comprising $K\alpha$ X-ray photon energy with wavelengths corresponding to Cobalt on electromagnetic radiation fluoresced from the thin film disk, the X-ray fluorescence measurement device further configured to estimate a composite index of refraction and a composite extinction coefficient for the at least one base layer;

an ellipsometry measurement device configured to reflect light from a surface of the thin film disk corresponding to the overcoat layer and collect polarization data for the light reflected from the metal layers below the overcoat layer; and a data analyzer configured to correlate the composite index of refraction and the composite extinction coefficient of the at least one base layer, the data analyzer further configured to adjust the composite index of refraction and the composite extinction coefficient used in the ellipsometry data to reflect metal layer variation due to metal layer composition and metal layer manufacturing using the correlated composite index of refraction and the composite extinction coefficient derived from the x-ray fluorescence measurement device and estimate the thickness of the overcoat layer using the adjusted composite index of refraction and the composite extinction coefficient to correct for errors in the polarization data and estimate the thickness of the overcoat layer using the adjusted properties to correct for errors in the polarization data.

* * * * *